(12) United States Patent
Barton et al.

(10) Patent No.: US 7,344,792 B2
(45) Date of Patent: Mar. 18, 2008

(54) ELECTRICAL CONTACTING DEVICE FOR A FUEL CELL

(75) Inventors: Russell Howard Barton, New Westminster (CA); Wendy Wan Yan Ho, Vancouver (CA); Simon Farrington, Vancouver (CA); Maura H. Malone, Vancouver (CA)

(73) Assignee: Ballard Power Systems Inc., Burnaby, BC (CA)

( * ) Notice: Subject to any disclaimer, the term of this patent is extended or adjusted under 35 U.S.C. 154(b) by 521 days.

(21) Appl. No.: 10/384,399

(22) Filed: Mar. 6, 2003

(65) Prior Publication Data

US 2003/0215678 A1 Nov. 20, 2003

Related U.S. Application Data

(63) Continuation-in-part of application No. 09/956,749, filed on Sep. 19, 2001, now abandoned.

(51) Int. Cl.
*H01M 8/10* (2006.01)

(52) U.S. Cl. ............................. 429/32; 429/34; 429/35

(58) Field of Classification Search .................. 429/34, 429/35, 158, 160, 32; 439/66, 67, 86, 500, 439/775; 29/874, 876, 877, 878, 881, 884
See application file for complete search history.

(56) References Cited

U.S. PATENT DOCUMENTS 3,998,513 A * 12/1976 Kobayashi et al. ........... 439/91
4,118,092 A * 10/1978 Sado et al. .................... 439/91
4,309,492 A    1/1982 Bernard ....................... 429/161
4,431,715 A    2/1984 Isenberg ....................... 429/30
4,835,060 A * 5/1989 Kosiarski et al. ............ 428/447
4,918,814 A * 4/1990 Redmond et al. .............. 29/878
5,340,318 A    8/1994 Kunihiro ...................... 439/66
5,472,802 A    12/1995 Holland et al. ............... 429/54
6,280,202 B1 * 8/2001 Alden et al. ................... 439/66
6,307,394 B1 * 10/2001 Farnworth et al. ........... 324/765
6,410,176 B1   6/2002 Genc et al. .................... 429/13

FOREIGN PATENT DOCUMENTS

| CA | 2334951 | 12/1999 |
|----|---------|---------|
| EP | 1 001 666 A2 | 5/2000 |
| EP | 1 107 340 A2 | 6/2001 |
| WO | WO 98/10477 | 3/1998 |
| WO | WO 99/66339 | 12/1999 |

OTHER PUBLICATIONS

Z-Axis Connector Company, Silver STAX, www.z-axiscc.com/prodstax.htm, Accessed Jul. 19, 2001.
Z-Axis Connector Company, LCD Connectors, www.z-axiscc.com/prodlcd.htm, Accessed Jul. 19, 2001.

* cited by examiner

Primary Examiner—Bruce F. Bell
(74) Attorney, Agent, or Firm—Seed IP Law Group PLLC

(57) ABSTRACT

A contacting device comprising a non-metallic, electrically conductive elastomeric composition for providing reliable, corrosion resistant electrical contacts to fuel cell components. Such a contacting device is particularly suitable for measuring voltages at carbon separator plates in a solid polymer electrolyte fuel cell stack.

17 Claims, 4 Drawing Sheets

ELECTRICAL CONTACTING DEVICE FOR A FUEL CELL

CROSS-REFERENCE TO RELATED APPLICATION

This application is a continuation-in-part of U.S. patent application Ser. No. 09/956,749 filed Sep. 19, 2001, now abandoned which application is incorporated herein by reference in its entirety.

BACKGROUND OF THE INVENTION

1. Field of the Invention

The present invention relates to an electrical contacting device for electrically contacting a fuel cell, and particularly for contacting carbon separator plates in a solid polymer electrolyte fuel cell stack.

2. Description of the Related Art

Electrochemical fuel cells convert a fuel and oxidant to generate electrical power and reaction products. A preferred type of fuel cell is the solid polymer electrochemical fuel cell which employs a solid polymer electrolyte or ion exchange membrane. The membrane electrolyte is generally disposed between two electrode layers (a cathode and an anode layer) to form a membrane electrode assembly ("MEA"). In a typical solid polymer electrolyte fuel cell, the MEA is disposed between two electrically conductive separator or fluid flow field plates. Fluid flow field plates have at least one flow passage formed therein to direct a fluid reactant (either fuel or oxidant) to the appropriate electrode layer, namely the anode on the fuel side and the cathode on the oxidant side. The separator or flow field plates also act as current collectors and provide mechanical support for the MEAs.

Since the output voltage of a single fuel cell is relatively low (e.g. less than a volt), fuel cell power supplies typically contain many cells that are connected together, usually in series but sometimes in parallel, in order to increase the overall output voltage and power of the supply. In a series configuration, the fuel cells are typically arranged in a stack such that one side of a given separator plate serves as an anode side plate for one cell while the other side of the plate serves as the cathode side plate for the adjacent cell. Such a separator plate is referred to as a bipolar plate. A stack of multiple fuel cells is referred to as a fuel cell stack. The fuel cell stack is typically held together in its assembled state by tie rods and end plates. A compression mechanism is generally required to ensure sealing around internal stack manifolds and flow fields, and also to ensure adequate electrical contact between the surfaces of the plates and MEAs.

The bipolar plates in these fuel cells must meet certain mechanical, electrical, and corrosion resistance requirements. Metals may be considered for use in plate constructions, but many common metals and alloys are not suitable due to inadequate corrosion resistance. While corrosion resistant metallic compositions may instead be considered, difficulties are frequently encountered in making electrical contact through the passivating surface layers of these compositions. Coatings of various sorts have been proposed to allow for the use of metallic bipolar plates. For instance, as disclosed in published European patent application EP 1107340, an electrically conductive corrosion resistant polymer containing electrically conductive corrosion resistant filler particles may be used to coat the working faces of bipolar plates. A preferred alternative to metallic compositions is to use a suitable carbon for plate construction since carbon plates can be made suitably conductive and exhibit good corrosion resistance.

To draw power from the fuel cell stack, low resistance electrical connections are typically provided at each end of the fuel cell stack using a pair of copper or coated copper bus plates. It may, however, be desirable to electrically connect to one or more electrodes in the fuel cell stack for other reasons. These other electrical connections are typically not intended to carry the entire stack current. For instance, it can be useful to monitor individual cell voltages to detect for abnormally low voltages during operation. In turn, corrective action can then be taken to prevent a cell or cells from undergoing voltage reversal, and thus to prevent reversal-related damage from occurring to the cell and/or stack. (Voltage reversal can occur in a weaker cell in a series stack when that cell is incapable of providing current at the same level as other cells in the stack. In such a situation, a sufficiently high current generated by the other cells in the stack is forced through the weaker cell and drives it into voltage reversal.) Measuring each cell voltage and individually comparing each voltage to a reference voltage may seem onerous in practice. However, simple circuitry may be employed to detect low voltage conditions on a cell or cells and then to signal for corrective action.

Making reliable electrical connections to individual cells in such a fuel cell stack can be problematic though, particularly to cells employing carbon separator plates. As designs of fuel cells advance, the separator plates have become progressively thinner and more closely spaced. This makes it more difficult to align and install electrical contacts to the plurality of fuel cells in a stack. Further, the cell-to-cell spacing (i.e., cell pitch) is subject to variations due to manufacturing tolerances and to expansion and contraction during operation of the stack (as a result of thermal variations, internal pressure changes, and gradual compression of cell components over time). Thus, suitable connections must accommodate these variations. Further still, the fuel cell stack may be subject to vibration and thus reliable connections must be able to maintain contact even when subjected to vibration. Inappropriately installed connectors may also interfere with seals in the fuel cell.

Additional problems arise when employing conventional metal compositions for the connectors. In the immediate vicinity of a fuel cell, the environment may be humid, hot, and either acidic or alkaline. For example, in solid polymer electrolyte fuel cells, carbon separator plates may be somewhat porous. The environment in the immediate vicinity of the plates can therefore be somewhat similar to that inside the cells, with the consequence that the metallic connectors may be subject to corrosion. In turn, the connector may also be a source of contaminants. Further, the relatively good electrical conductivity of metallic connectors can be a disadvantage in the event of an inadvertent short between connectors that are connected to different cells in a series stack. Large currents can flow through such an inadvertent short thereby representing a hazard.

Various contacting devices have been considered for making such electrical connections. Copper tabs and spade type connectors have been contemplated but exhibit many of the aforementioned disadvantages. Published PCT patent application WO99/66339 for example shows a device employing flexible spring wire contacts that make a pressure connection to components in a fuel cell stack. Published European patent application EP1001666 shows the use of a flexible printed circuit board for making electrical connections to components in a fuel cell stack.

Accordingly, there remains a need for improved electrical contact within a fuel cell, particularly for contacting carbon separator plates in a solid polymer electrolyte fuel cell stack. This invention fulfills these needs and provides further related advantages.

BRIEF SUMMARY OF THE INVENTION

An improved electrical contacting device for contacting a fuel cell employs an electrical contact comprising a non-metallic, electrically conductive elastomer composition. The device may include a plurality of such electrical contacts in order to make connections to a plurality of fuel cells in a series stack. The contact or contacts are mounted on a suitable support and are electrically insulated to prevent shorting to other contacts. The device may be mounted to the fuel cell such that the electrical contact or contacts are compressed between the support and the fuel cell.

The elastomer composition in the electrical contact comprises an elastomer and a non-metallic electrical conductor. The composition contains sufficient conductor such that the composition itself is conductive. Suitable conductors include carbon or a conductive polymer. A suitable elastomer comprises silicone. A representative composition is carbon impregnated silicone.

The electrical contacts in the contacting device may be made entirely of the conductive elastomer composition. For instance, the contacts may be pads formed from the conductive elastomer composition that are mounted in a suitable support. Alternatively, the electrical contacts may be layered and comprise alternating electrically conductive layers (made of the elastomer composition) and electrically non-conductive layers (made of the elastomer). With this layered construction, both the contacts and the support for the contacts may be fashioned out of the same layered stock, in a single piece (since each contact in such a unitary device is electrically insulated from each other by the alternating elastomer layers). A comb configuration is suitable for a device in which the contacts are unitary with the support. Various configurations may be employed for the contacting face of the contacts in the preceding embodiments. For instance, the contacting face may be square.

Each contact in a layered embodiment may comprise multiple electrically conductive layers in order to make a single desired electrical connection to the fuel cell. Having multiple layers in the contact can ensure an adequate electrical connection in the event that connection difficulties are experienced with any single conductive layer. For instance, it may be desirable to have greater than three alternating electrically conductive elastomer composition layers in a contact.

The electrical contacting device may additionally comprise a circuit board in which the circuit board comprises a plurality of metallic contacts that engage with the electrical contacts in the support. The circuit board may be compressed against the support which in turn compresses the electrical contacts against the fuel cell.

The elastomer based electrical contacting device offers several desirable advantages. It is flexible and thus may maintain reliable connection to the fuel cell. The electrical resistance of the device (from contact through support) may be of intermediate magnitude, for example between about 500-1500 ohms, which is low enough for purposes of voltage measurement or the like but high enough to prevent substantial current from flowing in the event of an electrical short occurring between adjacent contacts (and hence between adjacent fuel cells in a stack). Corrosion at the interface between fuel cell and contact may be avoided by using a suitable non-metallic conductor in the contact. The improved electrical contacting devices are thus suitable for making electrical connections to a variety of fuel cell types, but particularly to carbon separator plates employed in a solid polymer electrolyte fuel cell.

In certain fuel cell embodiments, it may be desirable to incorporate modifications in the construction of the cell/s for purposes of supporting the contacting device and maintaining suitable electrical separation. For instance, the membrane electrode assemblies and/or the adjacent separator plates in an advanced solid polymer electrolyte fuel cell stack might be modified for such purposes. As an example, the teeth of a comb shaped electrical contacting device might be supported and separated using electrically insulating edge seals that form part of the membrane electrode assemblies. Such edge seals may be obtained by extending the edge seals found in some conventional membrane electrode assemblies. However, it may be desirable to employ some kind of stiffening means to stiffen the edge seals between the teeth of the comb shaped electrical device (e.g., by thickening the edge seal or by incorporating a stiff insert in these areas). Alternatively, tabs that extend from the ends of the separator plates may be used to support and separate the teeth instead.

These and other aspects of the invention are evident upon reference to the attached Figures and following detailed description.

BRIEF DESCRIPTION OF THE SEVERAL VIEWS OF THE DRAWING(S)

DETAILED DESCRIPTION OF THE INVENTION

The present electrical contacting device is particularly suited for making electrical connections with moderate resistance to a plurality of bipolar carbon separator plates in a solid polymer electrolyte fuel cell stack. As such, it is particularly suited for monitoring cell voltages in the fuel cell stack.

The contacts employed in such a device comprise a non-metallic, electrically conductive elastomer composition. The composition comprises a suitable elastomer and non-metallic electrical conductor. The elastomer imparts flexibility to the contacting device and is made of any thermoset or thermoplastic elastomer that is compatible with the fuel cell construction (such as elastomers used in internal fuel cell seals). Sufficient non-metallic conductor is employed in the composition to render it electrically conductive. The non-metallic conductor resists corrosion and preferably is similar to the material being contacted. Thus, for contacting a carbon separator plate, a similar particulate carbon may be employed as the non-metallic conductor. A representative elastomer composition for this application is carbon impregnated silicone.

Figure 1A:
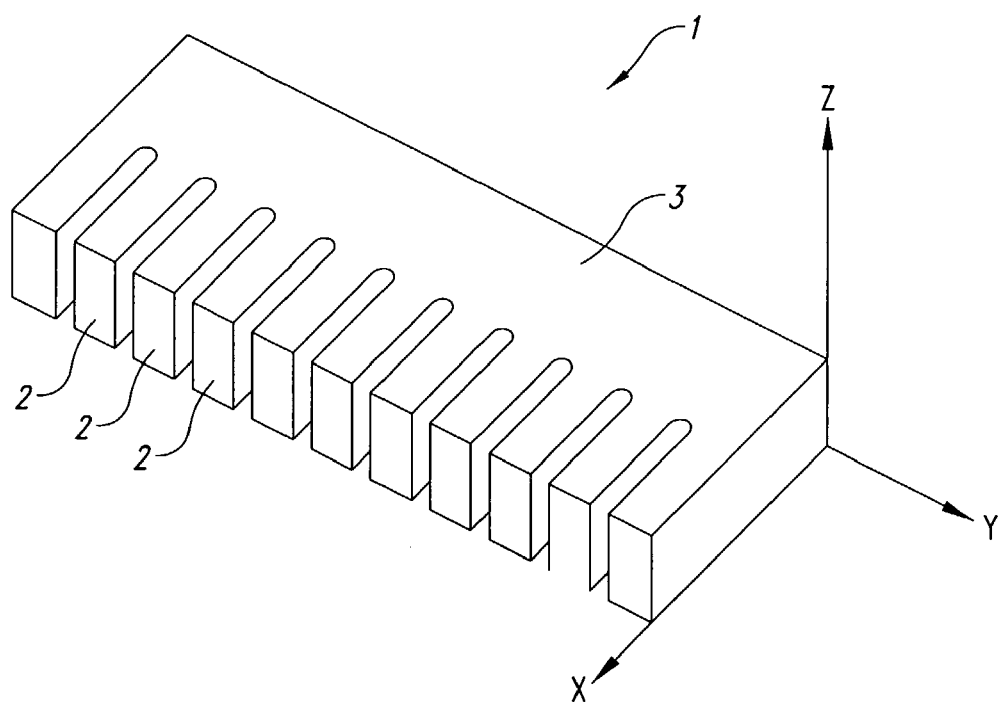
FIG. 1a is a perspective view of a comb shaped electrical contacting device of the invention.
Figure 1B:
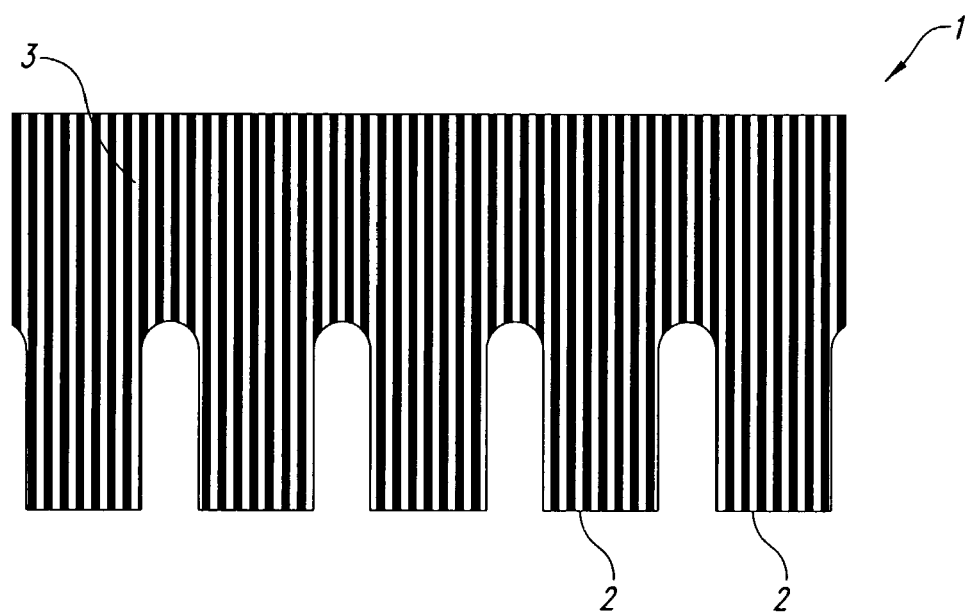
FIG. 1b is a top view of an actual micrograph of the electrical contacting device of the Examples and shows the alternating conductive (darker) and non-conductive (lighter) layers.

A representative electrical contacting device for connecting to multiple carbon separator plates in a fuel cell stack is shown in FIGS. 1a and 1b. Comb-shaped device 1 comprises eleven, square-faced electrical contacts 2 mounted on support 3. Device 1 has a layered construction comprising alternating electrically conductive layers (made of carbon impregnated silicone) and electrically non-conductive layers (made of silicone only). In the schematic shown in FIG. 1a, the alternating layers lie parallel to the X-Z plane. Thus, the device is conductive in the X and Z directions but not in the Y direction. The Y-Z face of each contact 2 then provides a conduction path to a Y-Z face of the same size on the opposite side of support 3. Each contact 2, however, is electrically insulated from each other in the Y direction by appropriate non-conductive layers. FIG. 1b shows a top view of an actual micrograph of the electrical contacting device employed in the Examples below. The darker layers are carbon impregnated silicone and the lighter layers are silicone. It is desirable to have more than one conductive layer present in each contact (e.g., >3) since this can provide for a satisfactory electrical connection overall in the event that any given layer makes poor contact with a separator plate. The device can be fashioned out of a single block of layered stock simply by machining appropriate slots therein to form the teeth of the comb. The device shown in FIG. 1b typically has about 7 conductive layers per contact.

An alternative device for contacting a plurality of separators in a stack contains a plurality of pads made solely of carbon impregnated silicone (i.e., without layers) mounted in a suitable support. The support in this case is made of a different, non-conductive material in order to insulate the contacts from each other. Alternatively, a device may simply have one contact only, and one such device can be employed for each desired contact in a stack.

The above electrical contacting devices provide for reliable connection to cells in a fuel cell stack. In turn, the electrical contacting devices are then used to reliably contact conventional metallic connectors away from the fuel cell stack. Since the environment around the typical solid polymer electrolyte fuel stack rapidly becomes less corrosive with distance from the stack, the electrical contacting device may be quite compact. For instance, satisfactory contact to conventional metallic connectors may be made of order of 1 cm away from the stack.

Figure 2:
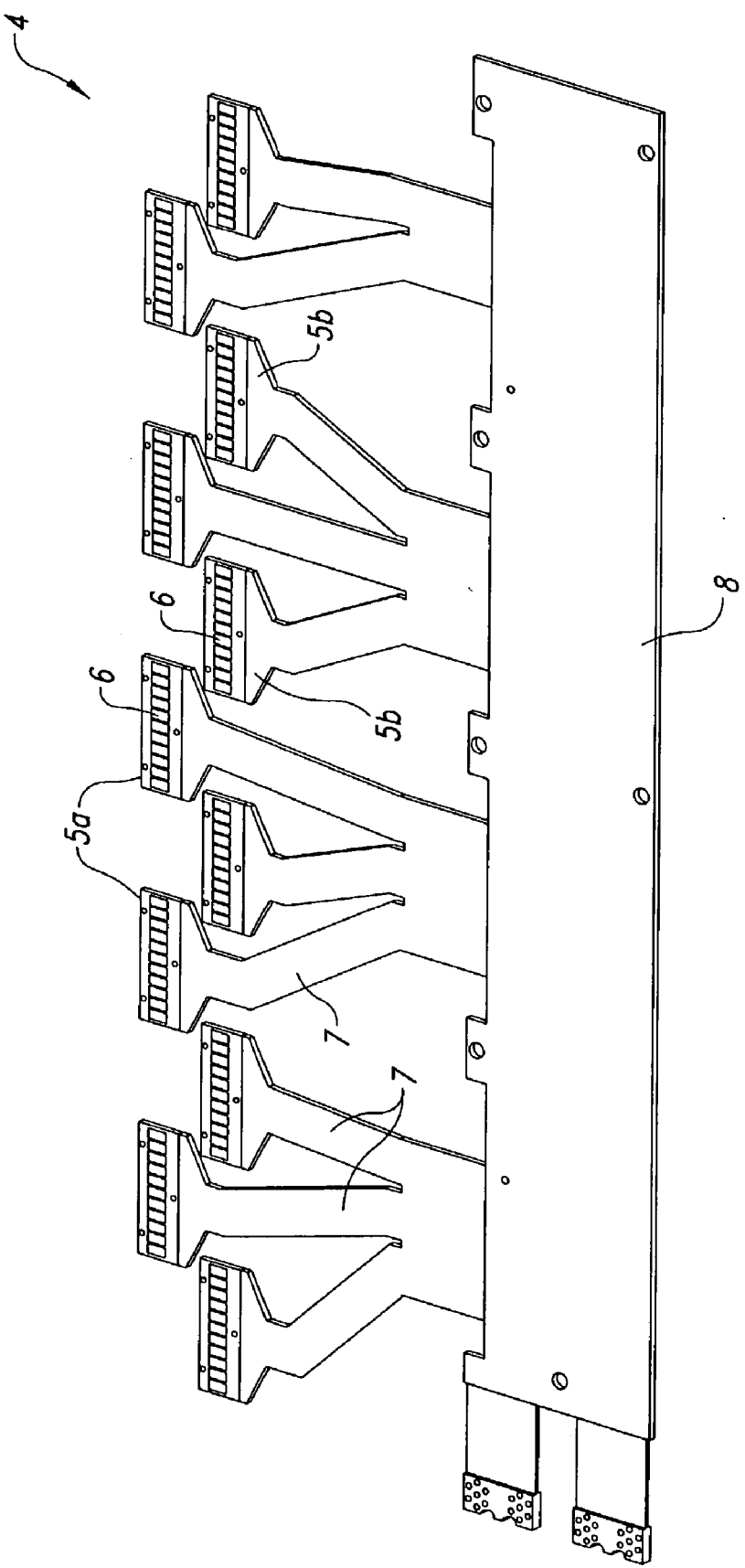
FIG. 2 shows a printed circuit board apparatus for mounting a plurality of contacting devices to a fuel cell stack in order to measure individual fuel cell voltages.

FIG. 2 shows a printed circuit board assembly 4 that may be used to interface eleven electrical contacting devices as shown in FIG. 1a to suitable voltage monitoring and/or control circuitry for a 110-cell solid polymer fuel cell stack. (In this embodiment, end contacts 6 on adjacent boards 5a and 5b connect to the same fuel cell to aid in alignment.) Assembly 4 comprises two parallel rows of printed circuit boards 5a and 5b. Each board 5a and 5b comprises eleven metallic contacts 6 to engage with the Y-Z face of the support 3 of electrical contacting device 1 as shown in FIG. 1a and thereby to electrically connect each metallic contact 6 to a corresponding non-metallic contact 2 in device 1. Boards 5a and 5b are staggered in two rows to accommodate dimensional variations of the stack (e.g., separator-separator distance or separator width variations). Metallic contacts 6 may be made of a corrosion resistant metallic composition, such as gold or a gold plated metal. Printed circuit boards 5a and 5b are made of a conventional rigid material which can be used to uniformly compress contacting devices 1 against the fuel cell stack. Two compliant linear compression bars may be used to apply compression force to the two respective rows of printed circuit boards 5a and 5b.

Printed circuit boards 5a and 5b are in turn connected to main board 8 by flexible sections 7. Main board 8 is also made of a rigid conventional material and may comprise suitable voltage monitoring and/or control circuitry for the fuel cell stack. Main board 8 is mounted on a housing for the fuel cell stack while printed circuit boards 5a and 5b are mounted to the stack itself. Flexible sections 7 accommodate tolerances in the stack components and allow for movement of fuel cells in the stack with respect to the housing. Flexible sections 7 may be made of a material such as Kapton® polyimide and have conductive traces thereon to connect each metallic connector 6 to an appropriate location on main board 8.

Figure 3:
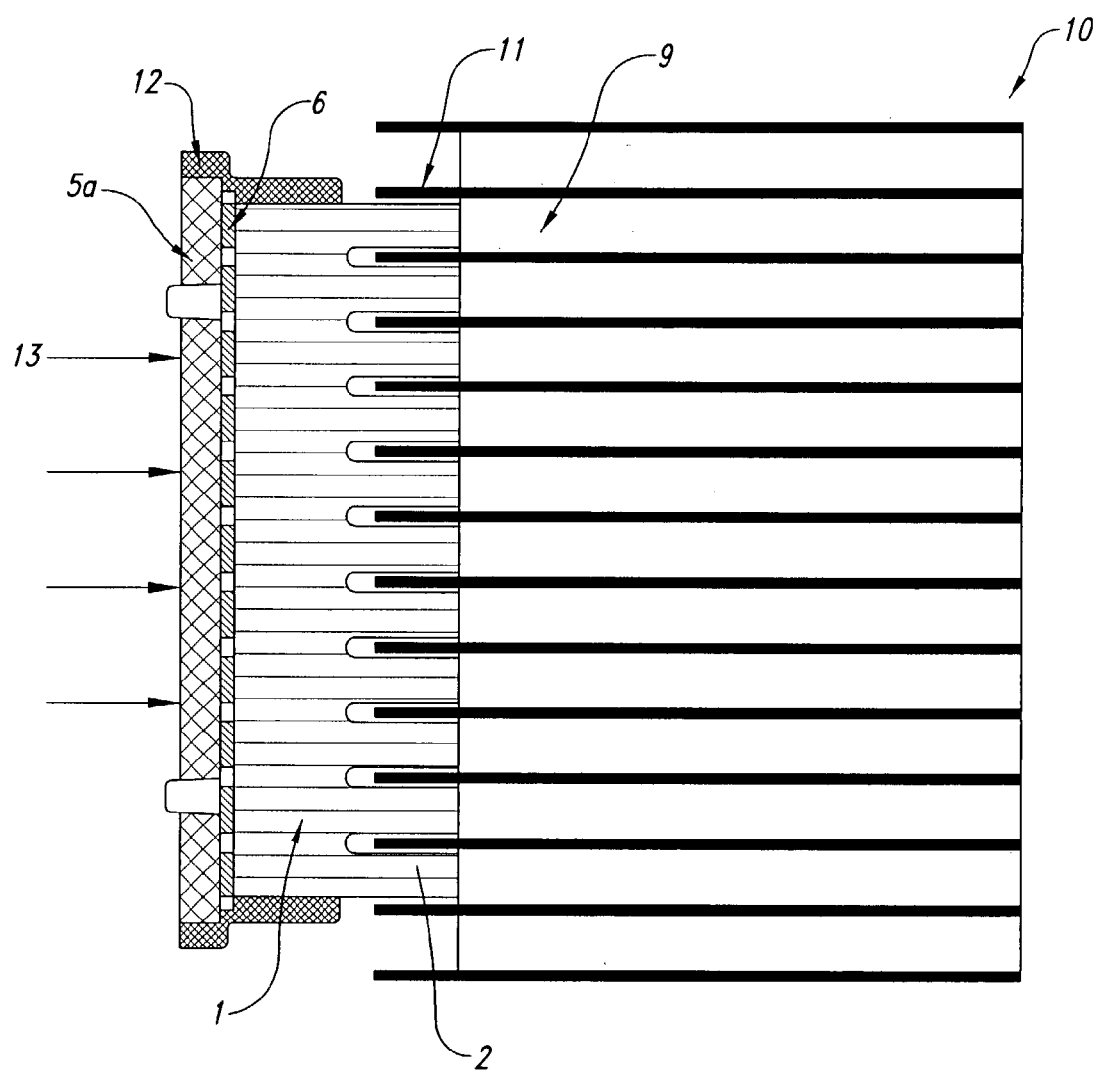
FIG. 3 shows the electrical contacting device contacting a plurality of separator plates in a solid polymer electrolyte fuel cell stack.

FIG. 3 shows a schematic drawing of electrical contacting device 1 connected to separator plates 9 in solid polymer electrolyte fuel cell stack 10. Stack 10 contains a series stack of fuel cells each of which comprises a membrane electrode assembly 11 sandwiched between two carbon based bipolar separator plates 9. As shown in FIG. 3, the membrane electrolyte in membrane electrode assembly 11 extends beyond the edge of separator plates 9 and into the slots separating contacts 2, thereby helping to align device 1 with respect to fuel cell stack 10 and preventing shorting between adjacent contacts 2. Retainer 12 (made of nylon or other suitable material) serves to align device 1 with printed circuit board 5a and to hold the two together. Compressive force (indicated by arrows 13) is applied by a compliant compression bar (not shown) which compresses metallic contacts 6 against device 1 and also compresses device 1 against separator plates 9. The compliant compression bar may be mounted to the stack and one end is allowed to float (displace) to accommodate movement in the stack.

In the preceding, the protruding membrane electrolyte is used to locate and to provide suitable separation for the teeth of comb-shaped device 1. In advanced solid polymer electrolyte stack designs however, a different design may be required. For instance, the membrane may be undesirably thin for this purpose. Further, it may be desirable for other manufacturing purposes to use "flush-cut" membrane electrode assemblies in which the membrane electrolyte is cut evenly with the electrodes and thus cannot be used as shown in FIG. 3. If the teeth of device 1 are unsupported, they may skew unacceptably when compressed against the stack thereby affecting the resistance of the contacts to the separator plates. Alternative means for supporting and separating the comb's teeth may thus be preferred in such fuel cell stacks.

Figure 4A:
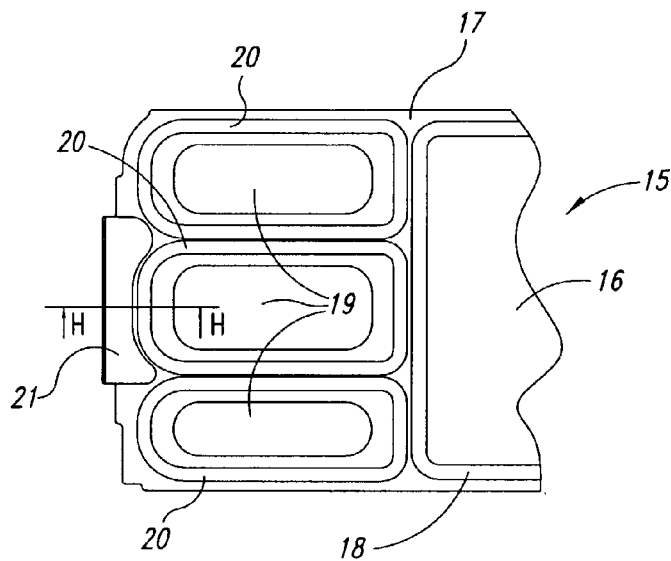
FIG. 4a shows a top view of a membrane electrode assembly comprising an edge seal suitable for use in an advanced fuel cell stack to locate and separate the teeth of the electrical contacting device.
Figure 4B:
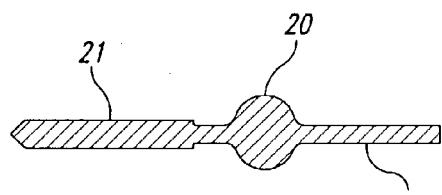
FIG. 4b shows a cross-sectional view of the edge seal in FIG. 4a along section H-H.

FIG. 4a shows the end portion of a membrane electrode assembly (MEA) that might be used in an advanced fuel cell stack in combination with comb-shaped device 1. MEA 15 includes a cell subassembly 16 (having a cathode, a membrane electrolyte, and an anode laminated together) and unitary edge seal 17. Edge seal 17 performs several functions and thus includes several features including subassembly seal 18 (which provides a seal between MEA 15 and an adjacent separator plate—not shown), manifold seals 20

(which provide seals around internal manifold openings 19 for the fuel, oxidant, and coolant fluids), and tab 21 which is used to locate, to support, and to separate the teeth of comb-shaped device 1 when it is compressed against this end of the fuel cell stack.

In typical stacks of this kind, edge seal 17 is made of a compatible flexible elastomer (e.g., silicone) and is relatively thin in regions not directly used for sealing. Tab 21 may be stiffened to better support the teeth of comb-shaped device 1. This may be accomplished by making tab 21 thicker (as shown in the cross-sectional view of the edge seal in FIG. 4a along section H-H) or by including a suitable stiffening insert as part of tab 21 (e.g., an insert made of a thermoplastic such as PVDF or Imidex™). Alternatively, a thinner tab 21 may be stiffened by providing improved support around its perimeter. This may be achieved by using extended separator plates with appropriate cutouts that align with the perimeter of tab 21 and which clamp tab 21 firmly around the perimeter when the stack is assembled.

Figure 4C:
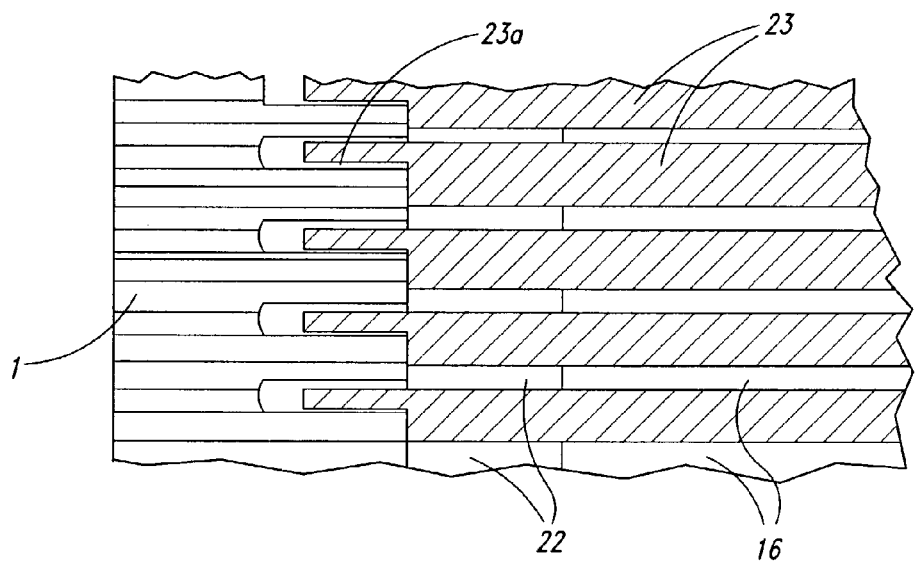
FIG. 4c shows a side view of an advanced fuel cell stack in which tabs are provided on the bipolar separator plates to locate and separate the teeth of the electrical contacting device.

FIG. 4c shows an alternative construction of an advanced fuel cell stack that may be used in combination with comb-shaped device 1. As in FIG. 4a, the stack here employs MEAs that include cell subassemblies 16 and unitary edge seals 22. Here however, edge seals 22 are not extended to support the teeth of device 1. Instead, as shown in the side view of FIG. 4c, tabs 23a are provided on bipolar separator plates 23 to locate, support, and separate the teeth of comb-shaped device 1.

The elastomer based electrical contacting device shown in the preceding Figures provides for reliable connection to a plurality of fuel cells. The device is compliant and capable of handling dimensional changes of the stack during operation (the materials used in the device are similar to materials used in the fuel cell stack and thus have similar thermal expansion properties) and capable of handling typical shock and vibration experienced by the stack. The electrical resistance of the carbon impregnated device is low enough to be acceptable for voltage measurement yet high enough to prevent significant current flow in the event of a short circuit between contacts. The use of a non-metallic conductor material that is similar to the separator plate material being contacted avoids any significant corrosion at the interface between contact and separator plate.

Alternative embodiments to that shown in the preceding Figures can be readily envisaged. For instance, the support may instead be made of an electrically insulating material and the contacts may extend through, yet be retained by, the insulating support. As another option, fewer contacts (as low as one per device) or more than the eleven shown may be employed in a given device. The number will depend in part on the various component dimensions and desired compliance.

EXAMPLES

Contacting devices were fabricated for purposes of connecting cell voltage monitoring apparatus to a 72 kw solid polymer electrolyte fuel cell stack. The devices had a layered construction as shown and described above (i.e., having alternating carbon impregnated silicone and silicone layers) and were custom manufactured by Z-axis Connector Co. Acceptable devices for this application were about 1 cm by 2½ cm by ½ cm in the X, Y, and Z directions, respectively, with respect to FIG. 1.

A 72 kw stack with monitoring apparatus was operated continuously for over 500 hours with no contact failures or cell shorting observed. In previous trials in which gold spring finger contacts were employed, a failure (either finger breakage, contact loss due to corrosion, or cell shorting) occurred on average about every 380 hours of operation.

In another test using similar devices connected to the separators in a 110 cell stack, each contact resistance (i.e., interface resistance of each contact to separator connection) was logged prior to stack operation. The contact resistances were all initially in the range from about 300 to 500 ohms. After two hours of continuous operation, each contact resistance was again logged. Little variation in contact resistance was observed for all the contact to separator connections. A similar 110 cell stack embodiment was then subjected to vibration testing. Again, the initial contact resistance for each contact was in the range from about 300 to 500 ohms. The stack was then vibrated in the lateral direction following USABC and IEC-68-2-6 durability testing requirements (frequency range 10-190 Hz with 3.5 g acceleration at low frequency and 0.75 g at high frequency). The contact resistances were less than 300 ohms after vibration testing. The non-metallic contacting devices make reliable contact to the separator plates in the stack and show improved performance over a conventional metallic contacting device.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A fuel cell stack comprising an electrical contacting device, wherein:
   the electrical contacting device comprises:
      a plurality of electrical contacts, each comprising a non-metallic, electrically conductive elastomer composition, wherein each electrical contact is layered and comprises alternating electrically conductive elastomer composition layers and electrically non-conductive elastomer layers; and
      a support on which the electrical contacts are mounted, wherein the support is layered and comprises alternating electrically conductive elastomer composition layers and electrically non-conductive elastomer layers, and wherein each electrically conductive elastomer composition layer of the electrical contacts are connected to, and in line with, an electrically conductive elastomer composition layer of the support and each electrically non-conductive elastomer layer of the electrical contacts are connected to, and in line with, an electrically non-conductive elastomer layer of the support;
   the electrical contacts are electrically insulated from each other, and the electrical contacts and the support form a comb shape; and
   the fuel cell stack comprises a plurality of membrane electrode assemblies interposed between a plurality of separator plates, wherein the membrane electrode assemblies comprise membrane electrolytes extending from an end of the membrane electrode assemblies and separating the teeth of the comb shaped electrical contacting device.

2. The fuel cell stack of claim 1 wherein the elastomer composition comprises an elastomer and a non-metallic electrical conductor.

3. The fuel cell stack of claim 2 wherein the conductor is carbon or a conductive polymer.

4. The fuel cell of stack claim 2 wherein the elastomer comprises silicone.

5. The fuel cell stack of claim 1 wherein each electrical contact comprises greater than three alternating electrically conductive elastomer composition layers.

6. The fuel cell stack of claim 1 wherein the electrical contacts are unitary with the support.

7. The fuel cell stack of claim 1 wherein the resistance of the electrical contacting device is in the range from about 500-1500 ohms.

8. The fuel cell stack of claim 1 wherein the contacting faces of the electrical contacts are square.

9. The fuel cell stack of claim 1 wherein the electrical contacts comprise pads.

10. The fuel cell stack of claim 1 additionally comprising a circuit board comprising a plurality of metallic contacts wherein the metallic contacts in the circuit board engage with the electrical contacts in the support.

11. A fuel cell comprising an electrical contacting device, the electrical contacting device comprising at least one electrical contact comprising a non-metallic, electrically conductive elastomer composition, and a support on which the electrical contact is mounted,
   wherein the fuel cell comprises a plurality of membrane electrode assemblies interposed between a plurality of separator plates and the electrical contacting device further comprises a plurality of electrical contacts mounted on the support such that the electrical contacts are electrically insulated from each other and such that the electrical contacts and the support form a comb, and
   wherein the membrane electrode assemblies comprise electrically insulating edge seals extending from an end of the assemblies and separating the teeth of the comb shaped electrical contacting device.

12. The fuel cell of claim 11 wherein the fuel cell is a solid polymer electrolyte fuel cell.

13. The fuel cell of claim 11 wherein the electrical contact contacts a separator plate.

14. The fuel cell of claim 13 wherein the separator plate comprises carbon.

15. The fuel cell of claim 13 wherein the electrical contacting device is mounted to the fuel cell such that the electrical contact is compressed between the support and the separator plate.

16. The fuel cell of claim 11 additionally comprising stiffening means to stiffen the edge seals between the teeth of the comb shaped electrical device.

17. The fuel cell of claim 11 wherein the separator plates comprise tabs extending from an end of the separator plates and separating the teeth of the comb shaped electrical device.

* * * * *